United States Patent [19]

Price et al.

[11] 4,192,800

[45] Mar. 11, 1980

[54] PROCESS FOR THE MANUFACTURE OF AROMATIC NITRILES

[75] Inventors: Raymond Price; Nigel Hall, both of Manchester, England

[73] Assignee: Imperial Chemical Industries Limited, London, England

[21] Appl. No.: 929,198

[22] Filed: Jul. 28, 1978

[30] Foreign Application Priority Data

Aug. 4, 1977 [GB] United Kingdom ............... 32751/77

[51] Int. Cl.² ...................... C07C 120/00; C09B 43/00
[52] U.S. Cl. .................................... 260/205; 260/206; 260/207; 260/207.1; 260/207.5; 260/208; 260/465 R

[58] Field of Search ................... 260/205, 208, 465 R, 260/465.1, 207.1

[56] References Cited

U.S. PATENT DOCUMENTS 3,968,099  7/1976  Leverenz .......................... 260/465 R

*Primary Examiner*—Dolph H. Torrence
*Attorney, Agent, or Firm*—Cushman, Darby and Cushman

[57] ABSTRACT

Process for the manufacture of aromatic nitriles by reacting an aromatic halogen compound with formaldoxime in the presence of a copper catalyst and an acid-binding agent, preferably a tertiary amine. Particularly applicable to replacement of halogen ortho to the azo linkage of an azo dyestuff by cyano.

5 Claims, No Drawings

PROCESS FOR THE MANUFACTURE OF AROMATIC NITRILES

This invention relates to a chemical process and more particularly to a process for the manufacture of aromatic nitriles.

A number of methods for the preparation of aromatic nitriles is known, but particularly useful is the replacement of an aryl halogen atom by the cyano group, for example, by the action of cuprous cyanide at an elevated temperature, with or without an organic base (e.g. pyridine) as a promotor or solvent.

However, this method has the disadvantage that it involves the preparation and handling of a metal cyanide with consequent toxicity and effluent disposal problems.

It has been found that an aryl halogen atom can be replaced by the cyano group without th use of cyanide group-containing intermediates.

According to the present invention there is provided a process for the manufacture of aromatic nitriles which comprises reacting an aromatic chlorine, bromine or iodine compound with formaldoxime in the presence of a copper catalyst and an acid-binding agent.

Examples of the copper catalysts which may be used are cupric acetate, cupric benzoate and cuprous chloride, but the preferred catalyst is cuprous iodide.

Examples of acid-binding agents which may be used are alkali-metal salts of weak acids such as sodium acetate, potassium acetate and sodium benzoate, alkali-metal carbonates such as sodium carbonate and potassium carbonate, alkali-metal hydroxides such as sodium hydroxide, and tertiary amines such as triethylamine, tri-n-propylamine, 2,4-lutidine, 2,6-lutidine, 2,4,6-collidine and imidazole. Tertiary amines are preferred.

The reaction is preferably carried out in a solvent, for example, nitrobenzene, 2-nitrotoluene, dimethylformamide and ethylene glycol monomethyl ether.

The formaldoxime is preferably used in the form of its trimer

Reaction may be carried out at normal room temperature or at elevated temperature, for example, up to a temperature of 60° C.

The reaction may be applied, for example, to the replacement of the aromatic halogen atom or atoms by the cyano group in a compound of the structure:

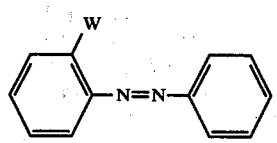

in which W represents a chlorine, bromine or iodine atom and in which the aromatic nuclei may carry other substituents, including chlorine bromine or iodine atoms ortho to the azo linkage.

Thus, the reaction is particularly useful when applied to azo dyestuffs such as an axo dyestuff of the formula:

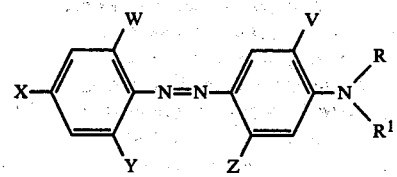

wherein X and Y each independently represent a hydrogen atom, a halogen atom or a lower alkyl, lower alkoxy, cyano, nitro, sulphone, optionally substituted sulphamoyl, optionally substituted carbamoyl or alkoxycarbonyl group, Z represents a hydrogen atom or a lower alkyl, lower alkoxy or NHCO.T group in which T represents a hydrocarbon radical, an amino group or a group —NHQ or —OQ in which Q represents a hydrocarbon radical, V represents a hydrogen atom, a halogen atom or a lower alkyl or lower alkoxy group, R and $R^1$ each independently represent an optionally substituted hydrocarbon radical and W represents a chlorine, bromine or iodine atom.

Examples of the lower alkyl groups represented by X, Y, Z and V are methyl, ethyl, n-propyl, isopropyl and n-butyl.

Examples of lower alkoxy groups represented by X, Y, Z and V are methoxy and ethoxy.

Examples of the hydrocarbon radicals represented by T and Q are aryl radicals, preferably the phenyl radical, and alkyl radicals, preferably lower alkyl radicals and particularly the methyl or ethyl radical.

Examples of the halogen atoms represented by X, Y and v are chlorine and bromine atoms.

Examples of sulphone groups represented by X and Y are methyl sulphonyl and ethylsulphonyl.

Examples of substituted carbamoyl groups represented by X and Y are N-methylaminocarbonyl, N,N-dimethylaminocarbonyl, N-ethylaminocarbonyl and N,N-diethylaminocarbonyl.

Examples of substituted sulphamoyl groups represented by X and Y are N-methylaminosulphonyl, N,N-dimethylaminosulphonyl, N-ethylaminosulphonyl and N,N-diethylaminosulphonyl.

The alkoxycarbonyl groups represented by X and Y are preferably lower alkoxycarbonyl groups, examples of which are methoxycarbonyl, ethoxycarbonyl and n-butoxycarbonyl.

The optionally substituted hydrocarbon radicals represented by R and $R^1$ may be optionally substituted alkyl, cycloalkyl, aralkyl or aryl radicals. It is preferred that R and $R^1$ are optionally substituted alkyl radicals and especially optionally substituted lower alkyl radicals.

Examples of optionally substituted hydrocarbon radicals represented by R and $R^1$ are methyl, ethyl, n-propyl, isopropyl, n-butyl, cyclohexyl, benzyl, β-phenylethyl, phenyl, 2-cyanoethyl, 2-hydroxyethyl, 2-acetoxyethyl, 2-methoxycarbonylethyl and 2-ethoxycarbonylethyl.

In this specification the terms "lower alkyl" and "lower alkoxy" means alkyl and alkoxy groups respectively which contain from 1 to 4 carbon atoms.

If the group Y is a chlorine, bromine or iodine atom then this group may also be replaced by the cyano group in addition to the group W.

The process of the invention is particularly useful when applied to azo compounds having the above structure wherein X and Y each independently represent a hydrogen atom, a halogen atoms, a lower alkyl group or a nitro group, Z represents a hydrogen atom or an acrylamino group, V represents a hydrogen atom, R and $R^1$ represent lower alkyl groups and W represents a chlorine, bromine or iodine atom. The group W is readily replaced by cyano when the azo compound is reacted with, for example, formaldoxime in the presence of copper (I) iodide and triethylamine in nitrobenzene as solvent.

The invention is illustrated but not limited by the following Examples in which parts and percentages are by weight.

EXAMPLE 1

A mixture of cuprous iodide (0.25 part), triethylamine (0.3 part), formaldoxime (0.17 part) (dissolved in diethyl ether (3 parts)), and nitrobenzene (20 parts) was stirred at room temperature for 30 minutes.

3-Acetylamino-4-(2'-bromo-4',6'-dinitrophenylazo)-N,N-diethylaniline (0.6 parts) was then added and the mixture was stirred at room temperature for 24 hours. The reaction temperature was then raised to 60° C. for 4 hours to complete the reaction.

The mixture was cooled, filtered and the solvent was removed by steam distillation. The solid residue was crystallised from ethanol to give 3-acetylamino-4-(2'-cyano-4',6'-dinitrophenylazo)-N,N-diethylaniline, the structure of which was confirmed by infra-red and NMR analysis.

EXAMPLE 2

A mixture of cuprous iodide (0.25 part), tri-n-propylamine (0.45 part), formaldoxime (0.17 part) (dissolved in diethyl ether (3 parts)) and nitrobenzene (20 parts) was stirred at room temperature for 30 minutes.

3-Acetylamino-4-(2'-bromo-4',6'-dinitrophenylazo)-N,N-diethylaniline (0.6 part) was then added and the mixture was stirred at room temperature for 48 hours.

The mixture was then filtered and the solvent was removed by steam distillation. The solid residue was crystallized from ethanol to give 3-acetylamino-4-(2'-cyano-4',6'-dinitrophenylazo)-N,N-diethylaniline.

EXAMPLE 3

A stirred mixture of 4-(2',4'-dibromo-6'-methylphenylazo)-N,N-diethylaniline (4.25 parts), copper (I) iodide (2.0 parts), formaldoxime trimer (1.75 parts), 2,6-lutidine (2.15 parts), and nitrobenzene (150 parts) was heated to 95° C. for 6 hours when thin layer chromatography showed reaction to be complete. The mixture was cooled, filtered and the nitrobenzene was removed by steam distillation. Crystallisation of the solid product from ethanol gave 4-(2'-cyano-4'-bromo-6'-methylphenylazo)-N,N-diethylaniline (Found: C, 58.2; H, 5.4; Br, 21.7; N, 15.2. $C_{18}H_{19}BrN_4$ requires C, 58.2; H, 5.15; Br, 21.55; N, 15.1%).

EXAMPLE 4

A stirred mixture of 3-acetylamino-4-(2',6'-dibromo-4'-nitrophenylazo)-N,N-diethylaniline (5.05 parts), copper (I) iodide (2.0 parts), formaldoxime trimer (1.75 parts), 2,6-lutidine (2.15 parts), and nitrobenzene (150 parts) was heated to 95° C. for 10 hours. Further copper (I) iodide (2.0 parts) and formaldoxime trimer (1.75 parts) were then added and the mixture was stirred for 6 hours at 95° C., when thin layer chromatography showed reaction to be effectively complete. The mixture was cooled, 3-acetylamino-4-(2',6'-dicyano-4'-nitrophenylazo)-N,N-diethylaniline (Found C, 59.1; H, 4.7; N, 24.15 $C_{20}H_{19}N_7O_3$ requires C, 59.25; H, 4.7; N, 24.2%).

EXAMPLE 5

A stirred mixture of 3-acetylamino-4-(2'-iodo-4',6'-dinitrophenylazo)-N,N-diethylaniline (4.8 parts), copper (I) iodide (2.0 parts), formaldoxime trimer (1.75 parts), 2,6-lutidine (2.15 parts), and nitrobenzene (150 parts) was heated to 95° C. for 10 hours when thin layer chromatography showed reaction to be complete. Isolation of the product as in Example 1 gave 3-acetylamino 4-(2'-cyano-4',6'-dinitrophenylazo)-N,N-diethylaniline (infra red spectrum identical with that of authentic material).

EXAMPLE 6

A stirred mixture of 3-acetylamino-4-(2'-bromo-4',6'-dinitrophenylazo)-N,N-diethylaniline(4.8 parts), copper (I) iodide (2.0 parts), formaldoxime trimer (1.75 parts), 2,6-lutidine (2.15 parts), and nitrobenzene (150 parts) was heated to 95° C. for 10 hours when thin layer chromatography showed reaction to be complete. Isolation by the method of Example 1 gave 3-acetylamino-4-(2'-cyano-4',6'-dinitrophenylazo)-N,N-diethylaniline (infra red spectrum identical with that of authentic material). Similar results were obtained when the 2,6-lutidine was replaced by 2,4-lutidine (2.15 parts) and 2,4,6-collidine (2.4 parts).

EXAMPLE 7

When the nitrobenzene employed in Example 6 was replaced by dimethylformamide (200 parts) reaction when to completion in 8 hours at 85° C. Isolation of the product by dilution with water, filtration and crystallisation from ethanol gave 3-acetylamino-4-(2',cyano-4',6'-dinitrophenylazo)-N,N-diethylaniline (infra red spectrum identical with that of authentic material.)

EXAMPLE 8

When the nitrobenzene employed in Example 6 was replaced by methyl cellosolve (150 parts) reaction went to completion in 5 hours at 95° C. The reaction mixture was cooled and filtered to obtain the product which crystallised from ethanol as black needles of 3-acetylamino-4-(2'-cyano-4',6'-dinitrophenylazo)-N,N-diethylaniline (infra red spectrum identical with that of authentic material).

EXAMPLE 9

A stirred mixture of 3-acetylamino-4-(2',4'-dibromo-6'-nitrophenylazo)-N,N-diethylaniline (5.3 parts), copper (I) iodide (1.9 parts), formaldoxime trimer (1.8 parts), 2,6-lutidine (2.15 parts), and nitrobenzene (100 parts), was heated to 90° C. for 10 hours when thin layer chromatography showed reaction to be effectively complete. The mixture was filtered, cooled, and the solvent was removed by steam distillation. Crystallisation of the solid product from ethanol gave 3-acetylamino-4-(2'-cyano-4'-bromo-6'-nitrophenylazo)-N,N-diethylaniline (Found; C, 49.5; H, 4.3; Br, 17.7; N, 18.3. $C_{19}H_{19}BrN_6O_3$ requires C, 49.65; H, 4.15; Br, 17.4; N, 18.3%)

EXAMPLE 10

When the 3-acetylamino-4-(2',4'-di-bromo-6'-nitrophenylazo)-N,N-diethylaniline employed in Example 9 was replaced by 4-(2'-bromo-4'-nitrophenylazo)-N,N-di(β-acetoxyethyl)aniline (4.8 parts) reaction was effectively complete in 7 hours at 90° C. Isolation of the product by the method of Example 9 gave 4-(2'-cyano-4'-nitrophenylazo)-N,N-di(β-acetoxyethyl)aniline (Found: C, 57.4; H, 5.1; N, 16.1. $C_{21}H_{21}N_5O_6$ requires C, 57.4; H, 4.8; N, 15.95%).

EXAMPLE 11

A stirred mixture of 3-acetylamino-4-(2'-bromo-4',6'-dinitro phenylazo)-N,N-diethylaniline (4.8 parts), copper (I) iodide (2.0 parts), formaldoxime trimer (1.8 parts), imidazole (1.35 parts), and nitrobenzene (100 parts) was heated to 85° C. for 7½ hours when thin layer chromatography showed reaction to be effectively complete. Isolation of the product by the method of Example 9 gave 3-acetylamino-4-(2'-cyano-4',6'-dinitrophneylazo)-N,N-diethylaniline (infra red spectrum identical with that of authenic material). When this experiment was repeated using 3.6 parts of imidazole in place of 1.8 parts a considerable amount of 3-acetylamino-4-(2',4'-dinitrophenylazo)-N,N-diethylaniline was produced in addition to the desired 3-acetylamino-4-(2'-cyano-4',6'-dinitrophenylazo)-N,N-diethylaniline.

EXAMPLE 12

A stirred mixture of 3-acetylamino-4-(2', 4'-dibromo-6'-methylphenylazo)-N,N-diethylaniline (4.8 parts), copper (I) iodide (2.0 parts), formaldoxime trimer (1.8 parts), triethylamine (1.5 parts), and nitrobenzene (100 parts) was heated to 90° C. for 1½ hours when thin layer chromatography showed reaction to be complete. Isolation by the method of Example 3 gave 3-acetylamino-4-(2'-cyano-4'-bromo-6'-methylphenylazo)-N,N-diethylaniline, infra red spectrum identical with that of authentic material.

We claim:

1. A process for the manufacture of an azo dyestuff having the formula:

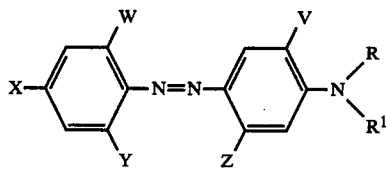

wherein

W represents a cyano group,

X and Y each independently represent a hydrogen atom, a halogen atom or a lower alkyl, lower alkyoxy, cyano, nitro, methylsulphonyl, ethylsulphonyl, unsubstituted carbamoyl, N-methylaminocarbonyl, N,N-dimethulaminocarbonyl, N-ethylaminocarbonyl, N,N-diethylaminocarbonyl, unsubstituted sulphamoyl, N-methylaminosulphonyl, N,N-dimethylaminosulphonyl, N-ethylaminosulphonyl, N,N-diethylaminosulphonyl or lower alkoxycarbonyl group, Z represents a hydrogen atom or a lower alkyl, lower alkoxy or NHCO.T group in which T represents a phenyl or lower alkyl radical, amino group or a group NHQ in which Q represents a phenyl or lower alkyl radical, V represents a hydrogen atom, a halogen atom or a lower alkyl or lower alkoxy group, and R and $R^1$ each independently represent a lower alkyl, cyclohexyl, benzyl, β-phenylethyl, phenyl, 2-cyanoethyl, 2-hydroxyethyl, 2-acetoxyethyl, 2-methoxycarbonylethyl or 2-ethoxycarbonylethyl group, which process comprises reacting the compound corresponding to said dyestuff in which W represents a chlorine, bromine or iodine atom, with formaldoxime in the presence of a copper catalyst selected from the group consisting of cupric acetate, cupric benzoate, cuprous chloride and cuprous iodide, and in the presence of an acid-binding agent, the reaction being carried out in a solvent selected from the group consisting of nitrobenzene, 2-nitrotoluene, dimethylformaminde and ethylene glycol monomethylether and at a temperature from normal room temperature up to 95° C.

2. A process as claimed in claim 1 wherein the formaldoxime is used in the form of its trimer.

3. A process as claimed in claim 1 wherein the copper catalyst is copper (I) iodide.

4. A process as claimed in claim 1 wherein the acid-binding agent is a tertiary amine.

5. A process as claimed in claim 1 wherein the azo dyestuff has the formula given in claim 1 in which X and Y each independently represent a hydrogen atom, a halogen atom, a lower alkyl group or a nitro group, Z represents a hydrogen atom or an acylamino group, V represents a hydrogen atom, R and $R^1$ represent lower alkyl groups and W represents a chlorine, bromine or iodine atom.

* * * * *